United States Patent [19]

Werkmann

[11] 4,324,145

[45] Apr. 13, 1982

[54] FLOWMETER HAVING A ROTARY BODY AND MEANS FOR IMPROVEMENT OF THE STARTING BEHAVIOR OF THE ROTARY BODY

[75] Inventor: Karl-Heinz Werkmann, Frankfurt am Main, Fed. Rep. of Germany

[73] Assignee: VDO Adolf Schindling AG, Frankfurt am Main, Fed. Rep. of Germany

[21] Appl. No.: 132,478

[22] Filed: Mar. 19, 1980

[30] Foreign Application Priority Data

Mar. 26, 1979 [DE] Fed. Rep. of Germany ....... 2911826

[51] Int. Cl.³ ................................................ G01F 1/10
[52] U.S. Cl. ................................ 73/861.89; 73/861.91
[58] Field of Search ........... 73/861.83, 861.89, 861.91, 73/861.92, 861.79, 861.84; 415/182, 183, 185, 191

[56] References Cited

U.S. PATENT DOCUMENTS

| 119,274 | 9/1871 | Kelley | 415/191 |
| 3,240,063 | 3/1966 | Brueckner | 73/861.83 |
| 3,788,142 | 1/1974 | Goransson | 73/861.83 |
| 4,012,957 | 3/1977 | Chiles et al. | 73/861.82 |

*Primary Examiner*—James J. Gill
*Attorney, Agent, or Firm*—Martin A. Farber

[57] ABSTRACT

A flowmeter having a rotary body which has at least one helical spiral on its outer periphery and which is rotatably supported in a flow channel, in which a straightening blade is arranged upstream from the rotary body. The walls (e.g., 10, 11) of the flow straightener blade increasingly thicken in the direction towards the rotary body.

6 Claims, 2 Drawing Figures

FLOWMETER HAVING A ROTARY BODY AND MEANS FOR IMPROVEMENT OF THE STARTING BEHAVIOR OF THE ROTARY BODY

The present invention relates to a flowmeter having a rotary body which has at least one helical spiral on its outer periphery and which is rotatably supported in a flow channel, in which a flow rectifier or straightening blade is arranged upstream from the rotary body, the flow rectifier consisting of substantially planar or flat walls which are oriented in the direction of flow.

With such a type of a known flowmeter the helically shaped spirals are formed on an outer wall of the approximately cylindrical rotary body. The rotary body as a rule is rotatably mounted in two bearings, of which bearings one is mounted upstream with respect to the rotary body, while the second bearing as an opposing counter bearing is arranged downstream. The counter bearing in this connection also assumes an axial pressure force which is formed particularly on its front face side by means of the flow of the medium against the rotary body.

For suitable measuring properties of this flowmeter, a so-called flow rectifier or straightener blade is arranged in the flow channel upstream of the rotary body, the straightener blade consisting, as a rule, of two flat walls which are arranged parallel to the direction of flow and which are assembled at right angles in such a manner as to be of cruciform shape in cross section.

Such flowmeters have relatively favorable measuring properties at relatively high rates of flow since in such case there is a linear relationship between the flow and the speed of rotation of the rotary body. However, the characteristic curves of ordinary flowmeters with a rotary body are relatively non-linear at relatively low rates of flow. With very low velocities of flow the flowmeter does not provide a usable measurement value at all, since the rotary body does not start to move.

It is an object of the present invention, while avoiding the disadvantages of the known flowmeters, to improve the starting behavior at low rates of flow or respectively to make starting possible despite a low rate of flow, and as a whole to improve the shape of the characteristic curve for relatively low velocities of flow.

This object is aided in its solution in accordance with the invention with a flow meter of the afore-mentioned type in the manner that the walls (e.g., 10, 11) of the flow straightener blade increasingly thicken in the direction towards the rotary body (3).

In this manner a particularly good startup with low rates of flow is reliably obtained. This is because the velocity of flow is increased in the region of the thickened ends of the walls as compared with the average velocity of flow in the flow channel (a housing or a conduit respectively) so that the rotary body is acted on, i.e. flowed against, with relatively high speed. In this case the force of the flow acts relatively far to the outside so that a correspondingly larger moment of rotation is produced. Finally, due to the fact that the rotary body is flown against towards its outside, i.e. predominantly in the region of the helical spiral or rib, the pressure against the front face side or end of the rotary body is reduced, fluid flowing against it only slightly. In this way friction in the opposite or counter bearing is also reduced. All these effects act cumulatively to assure a particularly good starting.

As a further development of the flowmeter of the invention, the thickness of the walls (9, 10) of the flow rectifier or straightener blade (9) increases proportionally with the decreasing distance from the rotary body (3). With this dimensioning of the walls, a particularly good flow behavior is obtained, which furthermore has an advantageous effect on the starting of the rotary body.

It is particularly advantageous to form the flowmeter in such a manner that the outer periphery (12) of the rotary body, from which the helical spirals (5, 6) are formed, lies in the tangential extension of those ends of the walls (10, 11) which face the rotary body.

In this manner the face end of the rotary body itself is no longer acted on substantially by the flowing medium and the friction in the opposing counter bearing is therefore a minimum. The flow acts on the rotary body substantially now only in the region of the spirals, so that the gretest possible moment of rotation is produced.

The walls of the flow rectifier or straightener blade may advantageously be made of synthetic material or plastic.

In this way the desired shaping—or thickening of the walls along their length—can be produced with relatively simple means, particularly if the flow straightener blade is made by a plastic injection molding or casting process.

With the above and other objects and advantages in view, the present invention will become more clearly understood in connection with the detailed description of a preferred embodiment, when considered with the accompanying drawing, of which:

Figure 2:
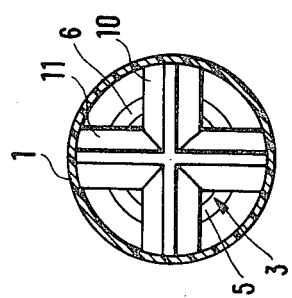
FIG. 2 is a cross-section of a part of the flowmeter, namely the flow straightener, viewed in direction of the flow.
Figure 1:
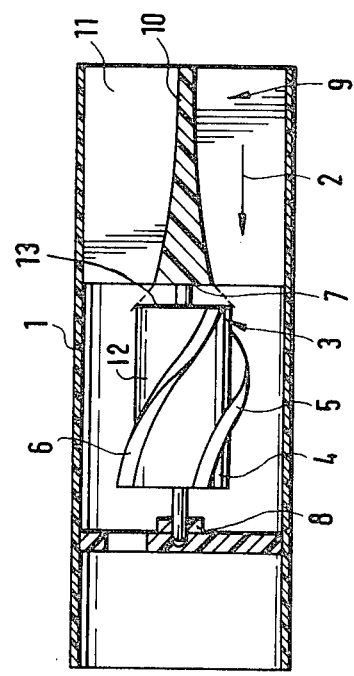
FIG. 1 is a longitudinal section through the flowmeter of the invention.

Referring to FIG. 1, a housing wall 1 of a housing formed as a hollow cylinder bounds and defines a flow channel. The flow channel is traversed by a fluid flowing therethrough in the direction indicated by the arrow 2. A rotary body 3 is supported in the housing coaxial to the main axis of the housing (not shown). The rotary body comprises a cylindrical basic body 4, on the outer periphery of which there are developed helically shaped spirals or ribs 5, 6 (additional ribs are not visible in the drawing). These ribs form vanes against which fluid can flow, and which produce a moment of rotation on the rotary body.

The rotary body is supported upstream in a bearing 7. Downstream there is provided an opposing counter bearing 8 which is also adapted to assume pressure forces which are exerted on the bearing by means of the rotary body.

Upstream in front of the rotary body, there is arranged a flow straightener or rectifier blade 9 which comprises two walls 10, 11 which cross each other at a right angle. The walls, which are made of plastic in the same manner as the other parts of the flowmeter, thicken increasingly and disproportionately in the direction indicated by the arrow 2 or direction of flow. They thicken to such a degree that, as indicated by the dashed line, the outer periphery 12 of the rotary body 3 is located tangentially to, or in the tangential extension of, those ends of the walls 10, 11 which face the rotary body 3. In this way the result is obtained that the flow is directed substantially only against the spirals 5, 6, but not on the front face end 13 of the basic body 4 of the rotary body 3.

As a result of this flow against the rotary body which takes place as a result of the dimensioning, the rotary body 3 begins to turn even with only small rates of flow of the fluid flowing in the direction indicated by the arrow 2, particularly as the pressure exerted in the counter bearing 8 is very small, so that only a small amount of friction need be overcome there.

As a whole the flowmeter described shows good measurement behavior even in the region of low rates of flow, that is, an at least approximately linear relationship between the rate of flow and the speed of rotation of the rotary body. The behavior is obtained at hardly any additional cost of manufacture, this additional cost being caused merely by the fact that the thickness of the walls of the flow straightener blade 9 increases. On the other hand, however, the counter bearing 8 can be made weaker or thinner since it need assume only smaller pressure forces as compared with the traditional flowmeters.

While there has been disclosed one embodiment of the invention it is to be understood that this embodiment is given by example only and not in a limiting sense.

I claim:
1. A flowmeter, comprising
  a housing wall defining a flow channel therein adapted for flow therethrough,
  a rotary body having at least one helical spiral on an outer periphery thereof,
  means for rotatably supporting said rotary body in said flow channel,
  a flow straightening blade disposed in said flow channel upstream of said rotary body, said flow straightening blade having walls oriented substantially in a direction of flow, and
  said walls of said straightening blade thicken increasingly in a direction toward and up to said rotary body.
2. The flowmeter as set forth in claim 1, wherein
  the thickness of said walls of said straightening blade increases disproportionately with decreasing distance from said rotary body.
3. The flowmeter, as set forth in claim 1 or 2, wherein
  said walls of said straightening blade have ends facing towards said rotary body,
  the outer periphery of said rotary body is disposed substantially tangentially to but spaced from said ends of said walls of said straightening blade,
  said at least one helically shaped spiral is formed from and on said outer periphery of said rotary body.
4. The flowmeter as set forth in claim 3, wherein
  said at least one helically shaped spiral comprises a plurality of spiral vanes.
5. The flowmeter, as set forth in claim 1, wherein
  said walls of said straightening blade are made of plastic.
6. The flowmeter, as set forth in claim 1, wherein
  said rotatably supporting means includes a bearing formed in a thickest end portion of sid walls.

* * * * *